United States Patent
Hui

(10) Patent No.: US 7,429,993 B2
(45) Date of Patent: Sep. 30, 2008

(54) METHOD AND SYSTEM FOR PRESENTING FUNCTIONALLY-TRANSPARENT, UNOBTRUSIVE ON-SCREEN WINDOWS

(75) Inventor: Alex Hui, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 83 days.

(21) Appl. No.: 10/943,585

(22) Filed: Sep. 17, 2004

(65) Prior Publication Data

US 2006/0061597 A1 Mar. 23, 2006

(51) Int. Cl.
G09G 5/00 (2006.01)
G09G 5/02 (2006.01)
G06F 3/48 (2006.01)

(52) U.S. Cl. .......................... 345/629; 345/592; 715/768

(58) Field of Classification Search ................ 345/592, 345/594, 650, 661, 676, 629; 715/768, 797, 715/767
See application file for complete search history.

(56) References Cited

U.S. PATENT DOCUMENTS

| | | | | |
|---|---|---|---|---|
| 5,208,903 A | * | 5/1993 | Curry | 345/594 |
| 5,230,041 A | * | 7/1993 | Dinwiddie et al. | 345/520 |
| 5,245,322 A | * | 9/1993 | Dinwiddie et al. | 345/629 |
| 5,651,107 A | * | 7/1997 | Frank et al. | 715/768 |
| 5,805,163 A | * | 9/1998 | Bagnas | 715/768 |
| 5,892,511 A | * | 4/1999 | Gelsinger et al. | 715/794 |
| 5,949,432 A | * | 9/1999 | Gough et al. | 345/629 |
| 5,990,890 A | * | 11/1999 | Etheredge | 715/808 |
| 6,069,626 A | * | 5/2000 | Cline et al. | 715/786 |
| 6,333,753 B1 | * | 12/2001 | Hinckley | 715/768 |
| 6,429,883 B1 | * | 8/2002 | Plow et al. | 715/768 |
| 6,476,831 B1 | * | 11/2002 | Wirth et al. | 715/784 |
| 6,549,218 B1 | * | 4/2003 | Gershony et al. | 715/781 |
| 2003/0214540 A1 | * | 11/2003 | Huapaya et al. | 345/863 |
| 2005/0044500 A1 | * | 2/2005 | Orimoto et al. | 715/706 |
| 2005/0251754 A1 | * | 11/2005 | Padgett et al. | 715/779 |

* cited by examiner

*Primary Examiner*—Ryan R Yang
(74) *Attorney, Agent, or Firm*—Microsoft Corporation

(57) ABSTRACT

Selected visual content is unobtrusively presented on a computing system display, so as not to obscure or prevent access to underlying content. The selected visual content may be designated from among various types of visual content by a user or by a program. The selected visual content is maintained as the topmost content so that it is not obscured by other visual content. In addition, the selected visual content is rendered to be at least partially visually transparent and functionally transparent, preferably using functionality already included in an operating system used by the computing system. The selected visual content can thus be viewed by a user while the user is still able to see and work with the other visual content on the display that may underlie the selected visual content, enabling the user to work more efficiently and make better use of the display.

25 Claims, 16 Drawing Sheets

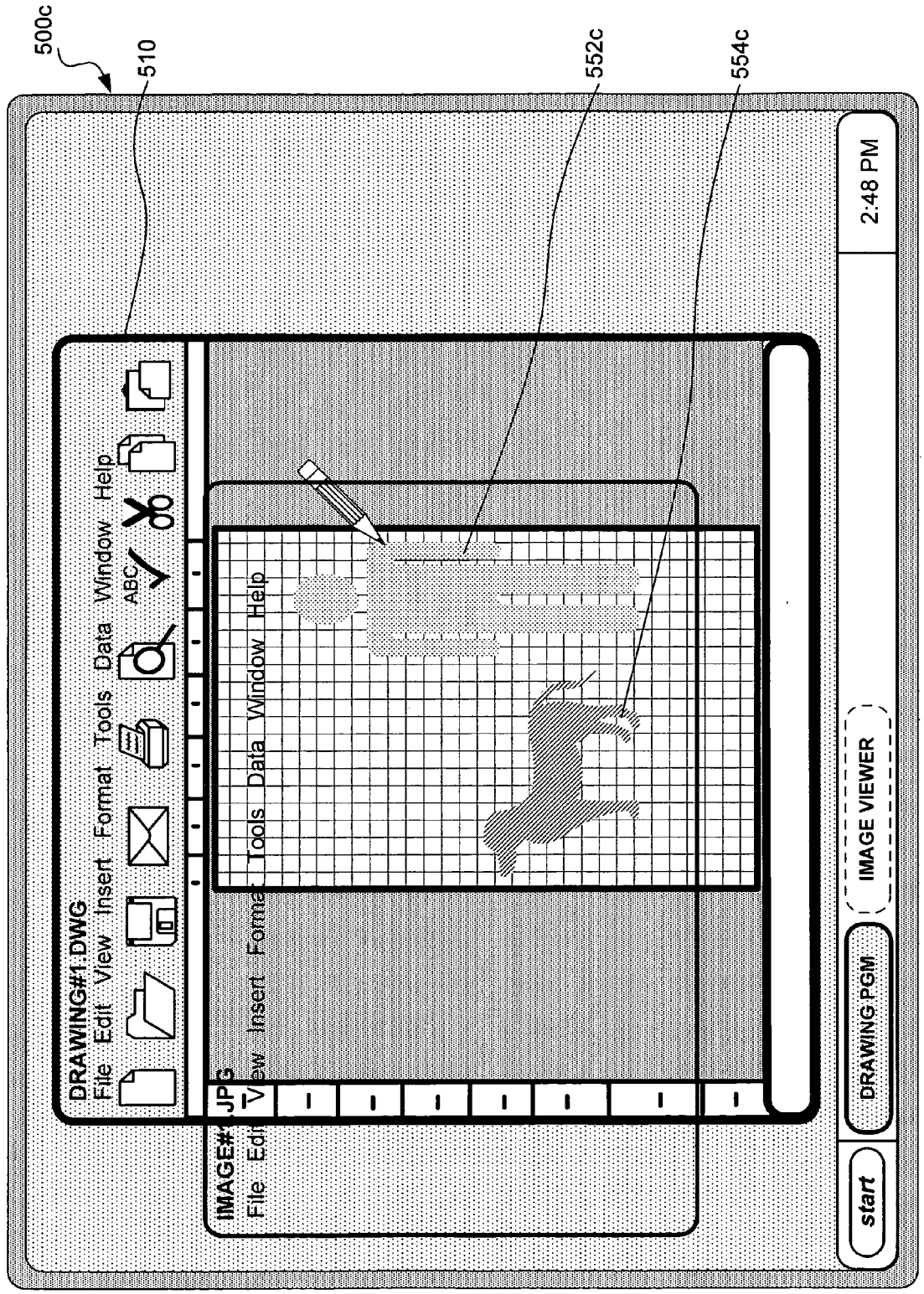

METHOD AND SYSTEM FOR PRESENTING FUNCTIONALLY-TRANSPARENT, UNOBTRUSIVE ON-SCREEN WINDOWS

FIELD OF THE INVENTION

The present invention generally pertains to presenting visual content generated by computer software applications, and more specifically, to a method and system for presenting visual content in an on-screen window so that underlying content is still visible and capable of being accessed by a user.

BACKGROUND OF THE INVENTION

Among the many advantages afforded by the ever-improving price performance of computers, perhaps two of the most beneficial are the ability to run more than one application program at one time and the increased user friendliness provided by graphical user interface operating systems, such as Microsoft Corporation's WINDOWS™ operating systems. Before the advent of multi-tasking graphical user interface operating systems, computers could only execute one task at a time. A user might want to work in a spreadsheet while accessing e-mail and/or perform word processing, but could only perform one of those functions at a time. However, using a multi-tasking graphical user interface operating system, a user can read or copy text from an e-mail message displayed in one window into a word processing application presented in another window, while running other applications in other windows, so that multiple tasks are being executed at one time by the computer. Allowing users to execute more than one application at a time, and to move information between those applications, has greatly improved the efficiency with which users can complete their work.

In addition, because programs are more user friendly, users can now learn new applications and learn new functions in those applications more easily than ever before. On-line error detection can catch inadvertent mistakes, such as a user attempting to close a changed document without saving it, and can then ask the user to confirm the user's choice. Similarly, automatically generated messages, such as calendaring reminders or notifications of e-mails being received, are presented to the user in on-screen windows to help keep a user aware of calendar events and of newly available information. Yet, the plethora of on-screen information may present problems. At times there may be just too many windows open on the display screen for the user to work with effectively, at least in the space permitted on the user's display.

For example, FIG. 1A illustrates a computer display 100a on which a browser window 110 and a spreadsheet application window 120 are open for a web browser currently accessing a web-based e-mail application and a spreadsheet application, respectively. The user may have both windows 110 and 120 open because the user wishes to copy information from browser window 110 into spreadsheet application window 120, or vice versa. Unfortunately, there is not enough room on the available area of display 100a to show the entirety of both windows 110 and 120 at the same time. Thus, the user will have to resize one of windows 110 or 120, or be willing for one of windows 110 or 120 to overlap the other while the topmost window is active. Unfortunately, if the user resizes one or both windows 110 and 120 so that one or both are smaller, the user might then have to scroll within the diminished-size windows to be able to view content of interest. Alternatively, to be able to view all of the area of interest in a smaller window, the user might have to reduce the font and/or scale size of the document of the document open in the window to a point where the document is hard to read.

In FIG. 1A, spreadsheet window 120 is the active window, as indicated by spreadsheet window 120 partially covering browser window 110. That spreadsheet window 120 is active also is indicated in a taskbar 130 by a taskbar button 134 that represents spreadsheet application window 120 being highlighted (as evident by its color, shade, and/or intensity), while a taskbar button 132 that represents browser window 110 in taskbar 130 is not highlighted. To make browser window 110 active, the user can select window 110 or taskbar button 132, which will enable the user to open an e-mail or perform another function. Unfortunately, when window 110 becomes active, it will partially cover spreadsheet application window 120, obscuring part of the page. Even if the user only wants to briefly view but not interact with one of the windows, an overlapping active window may cover at least a portion of the window or windows that the user wants to view.

The problem of not having enough room on the screen for all desired windows may also be complicated when a user accesses on-line help. In FIG. 1B, with the windows 110 and 120 presented on a display 100b, the user is accessing on-line help that appears in a window 140. Although the on-line help in window 140 may provide desired information to the user, it unfortunately covers part of spreadsheet window 120 for which the user has requested the help, because window 140 has become the active window, as indicated by window 140 appearing on top of window 120 and having a highlighted task button 136 in taskbar 130. Therefore, if the user was seeking help in creating a formula to be entered on a right-hand side of window 120 where on-line help window is now displayed, help window 140 blocks that area so that the user can neither see the help information or enter data in that portion of window 120 without having to rearrange the windows or resize the content presented on the screen.

Other automated features of the computing system also might hamper the user's ability to work. FIG. 1C shows a view of a display 100c where windows 110 and 120 are still displayed. In FIG. 1C, however, portions of both windows 110 and 120 are covered by a reminder window 150 that has been generated by a calendaring program (not shown). Reminder window 150, as indicated by a highlighted task button 138 in taskbar 130, automatically becomes the active window when it is opened on the display. As a result, a sudden appearance of reminder window 150 not only can block the window in which the user has been working, but in becoming the active window, will intercepts any input that was originally directed to one of the other windows 110 and 120 presented on display 100c and previously the active window. Thus, unfortunately, if the user was in the process of performing a mouse click, entering keystrokes, or providing other input, and the user was in the middle of a thought related thereto, the input to that work—and the thought—are lost, at least temporarily. The user cannot continue what the user had been doing just before reminder window 150 appeared, until the user closes or moves reminder window 150, or at least again sets one of the other windows in which the user wants to work, as the active window.

It would be highly desirable for users to be able to see all of the contents of a window without necessarily having to make it an active window. Specifically, it would be desirable to be able to see all of the content of a window without the need to make that window active so that it partially or largely covers another window, which the user wants to see or in which the user want to be able to work. Further, it would be desirable for a new window to appear on the screen without the user immediately losing the ability to enter input into what had just been the active window before the new window appeared. In short, it would be highly desirable to be able to view more information on a computer display without sacrificing the ability to view and access information or interact with a window that is currently displayed.

SUMMARY OF THE INVENTION

A major advantage of the present invention is that it provides a way to present additional information on a display without covering other visual content or even momentarily preventing a user from engaging other visual content presented on the display (i.e., for input or control thereof). The additional content, which may be selected from various types of available additional content, is presented on a display so that the content or any background or border around the content is at least partially visually transparent as well as functionally transparent. Thus, when this additional visual content is presented on the display, a user can at least partially see through the additional content to the content that already was presented on the display, even when the additional content is positioned on top of the content that was already presented on the display. Moreover, the user can interact with the content that underlies the additional content. Thus, if a user was in the middle of an operation, or just in the midst of expressing a thought, the user's input will be not lost by the appearance of this new window on the display. Information that is available in the new content can then be readily seen and entered in another application, because the new content is always visible, but does not hinder the user providing input or otherwise interacting with other content on the display.

One aspect of the present invention is thus directed to a method for unobtrusively presenting selected visual content in a display that is coupled to a computing system on which other visual content also is displayed. According to the method, the selected visual content is presented in a region of the display. The selected visual content is rendered as to enable a user to direct input to other visual content presented within the region of the selected visual content and enabling the computing system to respond to the input directed to the other visual content as though the selected visual content were not being presented on the display.

The selected visual content optionally is designated by either user input or by a software program that is executed on the computer system. Also, the selected visual content may include one or more of text, graphics, a blank area, an image, and a video.

According to the method, the selected visual content is presented in an unobtrusive overlay window generated by the operating system that is executed by and controlling the computing system. Presentation of the unobtrusive overlay window is controlled by directing the operating system to set attributes of the unobtrusive overlay window, to achieve the characteristics described above.

Further according to the method, the selected visual content optionally is protected from being masked by the other visual content in the region of the display. The selected visual content is protected from being masked by the other visual content by directing the operating system to apply an attribute that maintains the overlay window as a topmost window so that the other visual content is not presented over the selected visual content when the user directs input to the other visual content.

Also further according to the method, the selected visual content optionally is rendered so that the selected visual content is at least partially visibly transparent, thereby enabling the user to view the other visual content through the selected visual content. The selected visual content is rendered as partially visually transparent by changing at least one of an alpha value and a color key value in the attributes used to present the overlay window on the display. The color key value optionally is set such that a background color of the overlay window is not displayed.

According to the method, adjustment of at least one of the alpha value and the color key value optionally is enabled to vary a transparency of the overlay window. The selected visual content is rendered as at least one of functionally and visually transparent by changing at least one of a layer attribute and a transparency attribute of the overlay window.

In addition, at least one of a plurality of attributes of the overlay window may not be displayed. The attribute of the overlay window not displayed may include, for example, a title bar, a system menu, a resizable border, a maximize button, and a minimize button.

If desired, the unobtrusive overlay window is not included in a list of windows that are currently available on the display. For example, the list of windows currently available on the display may include a taskbar including taskbar buttons for windows currently available on the display other than the selected content.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIGS. 5A-5D are screens showing an unobtrusive window allowing a user to open an image window and cause it to be presented unobtrusively to allow the user to engage the image in a drafting application;

DESCRIPTION OF THE PREFERRED EMBODIMENT

Unobtrusive Overlay Window Used to Facilitate Access to On-Line Help

Figure 1A:
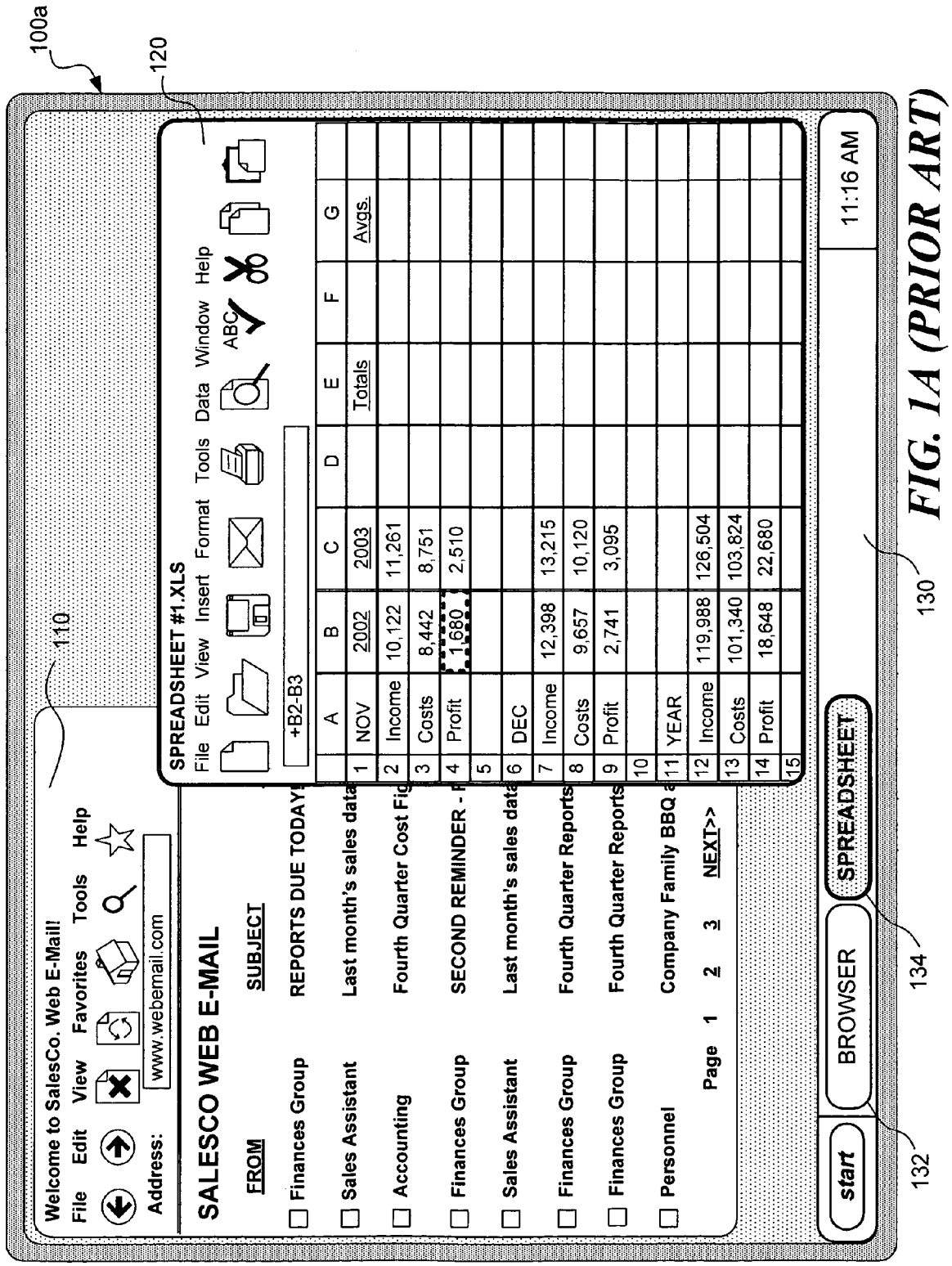
FIGS. 1A-1C (Prior Art) are screens showing a plurality of overlapping windows on a display, where topmost windows at least partially block visual and functional access to other windows.
Figure 1B:
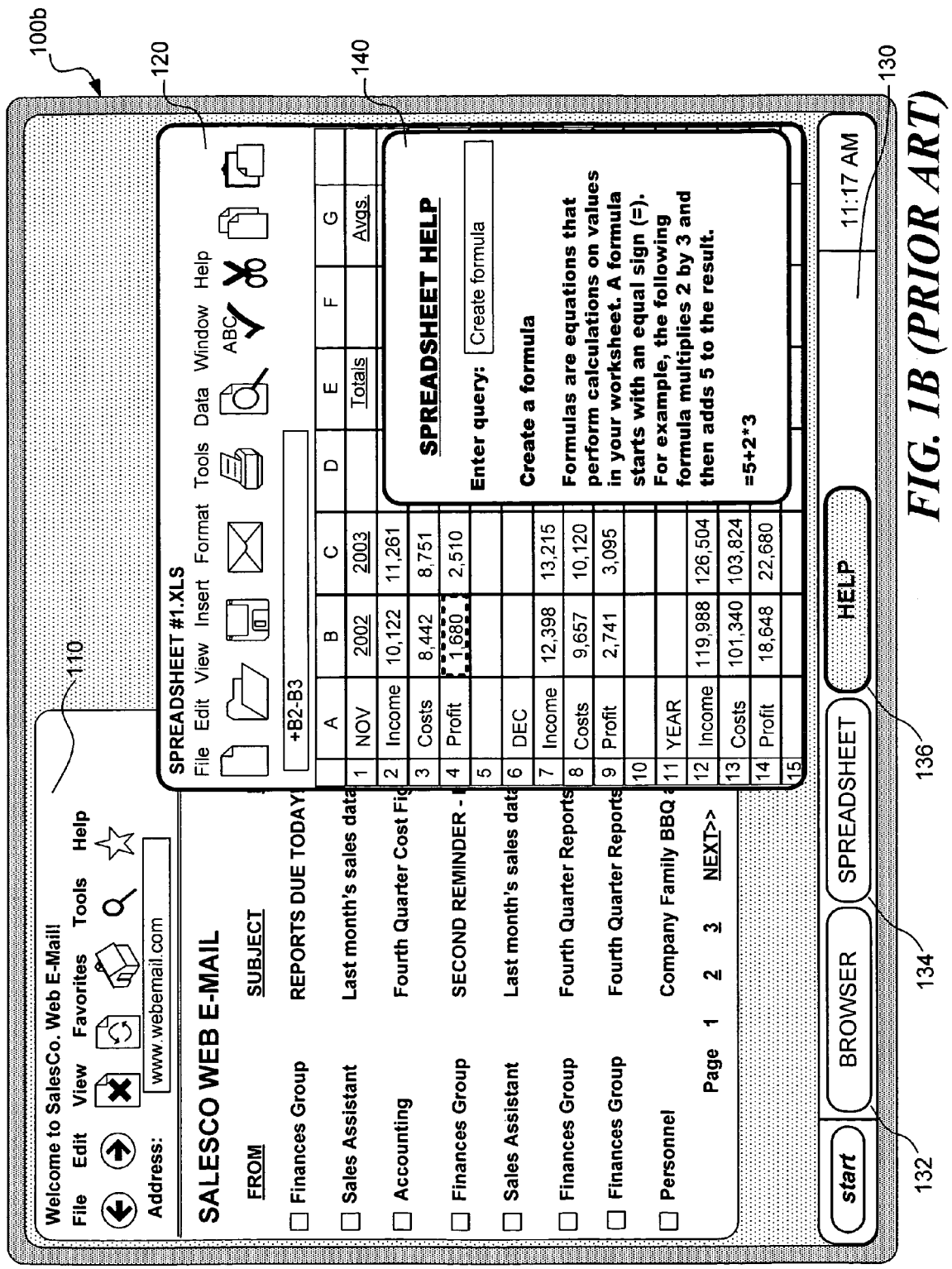
Figure 1C:
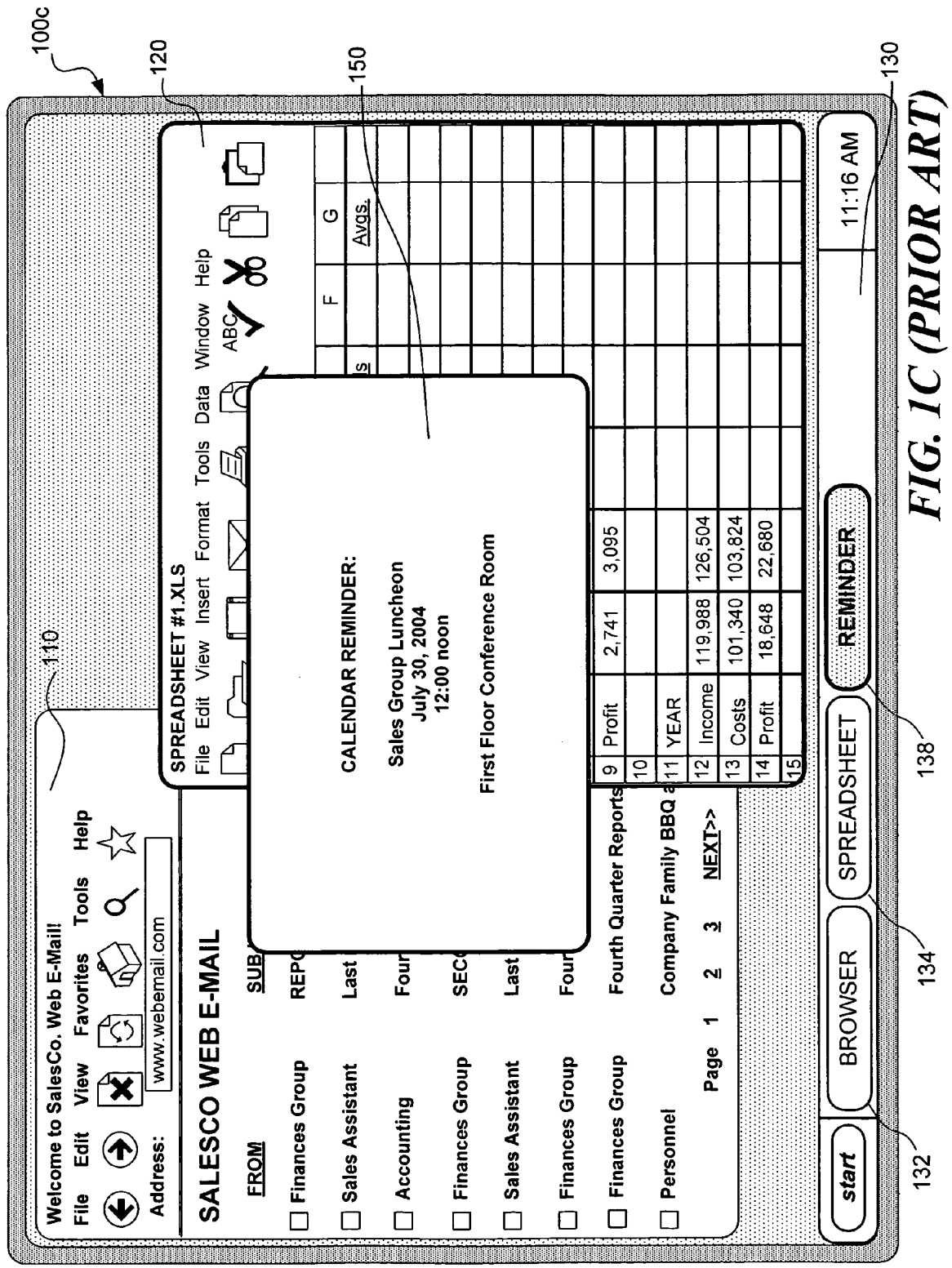
Figure 2A:
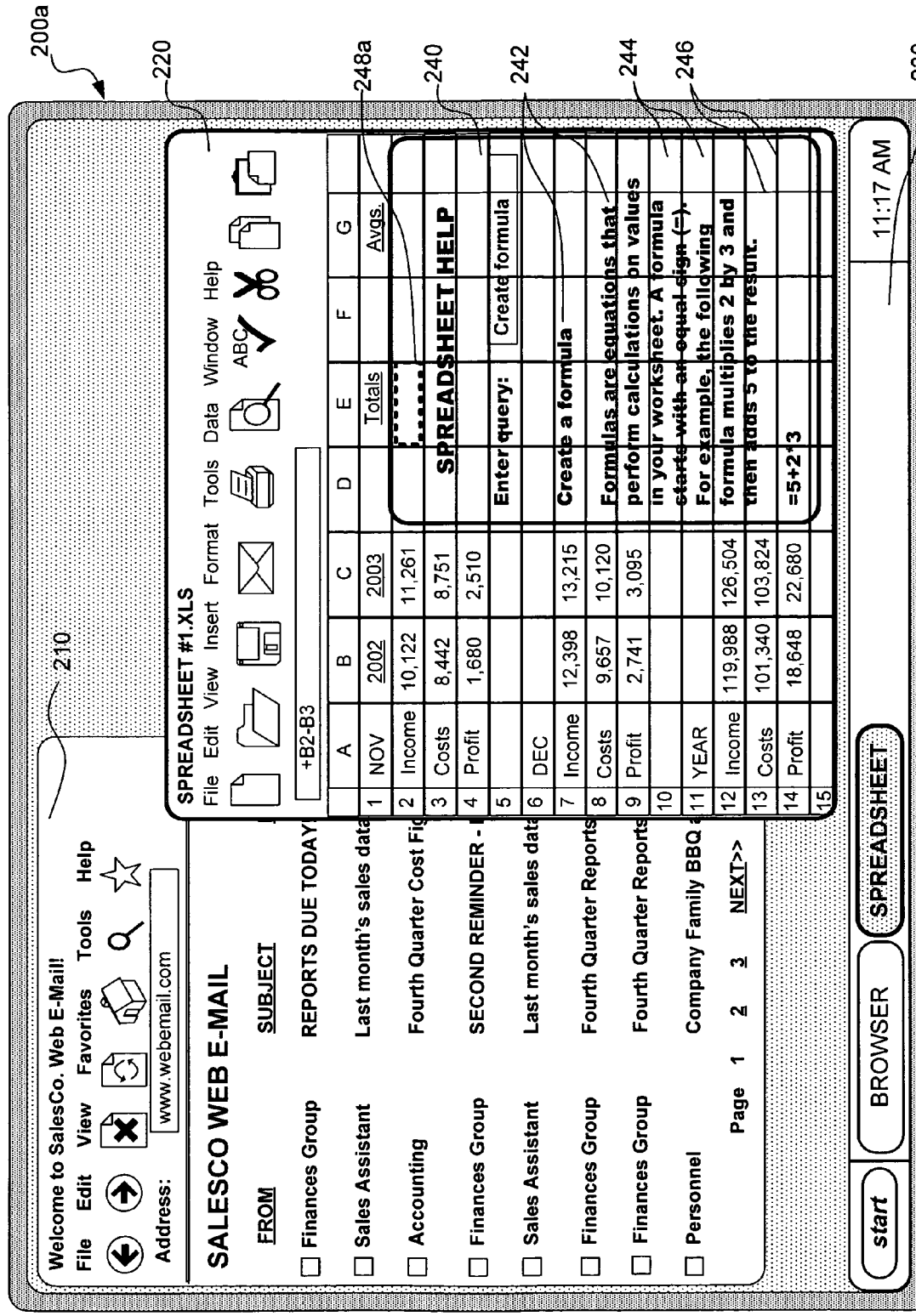
FIGS. 2A-2B are screens showing an unobtrusive window according to an embodiment of the present invention presenting a help screen that allows a user to continue to interact with other visual content on a display in the same region of the help screen while the help screen is present.

FIG. 2A is a display 200a presented by a computing system employing an embodiment of the present invention to show how an unobtrusive overlay window 240 enables a user to access on-line and on-screen help while still able to engage other visual content displayed on display 200a that is at least partially overlaid by display window 240. In a manner comparable to FIGS. 1A-1C, display 200a presents a browser window 210 and a spreadsheet application window 220. When seeking assistance with the spreadsheet application, a user accesses on-line help. In the prior art example illustrated in FIG. 1B, help window 140 covered and obscured part of spreadsheet application window 120. However, in FIG. 2A, unobtrusive overlay window 240 does not similarly hamper the user's access to spreadsheet application window 220.

Unobtrusive overlay window 240 is both at least partially transparent, and functionally transparent to facilitate unimpeded user access to other content on display 200a. As shown in the FIG. 2A, help text 242, which is presented in unobtrusive overlay window 240 is visible, and therefore accessible to the user. However, unlike the prior art example in FIG. 1B, a user can view a cell 244, which is defined by ledger lines 246, as well as an indication that a cell 248a is selected, through unobtrusive overlay window 240. Consequently, access to on-line help in the form of the unobtrusive overlay window 240 does not prevent the user from seeing the content presented on display 200a in a window that underlies the unobtrusive overlay window.

Figure 2B:
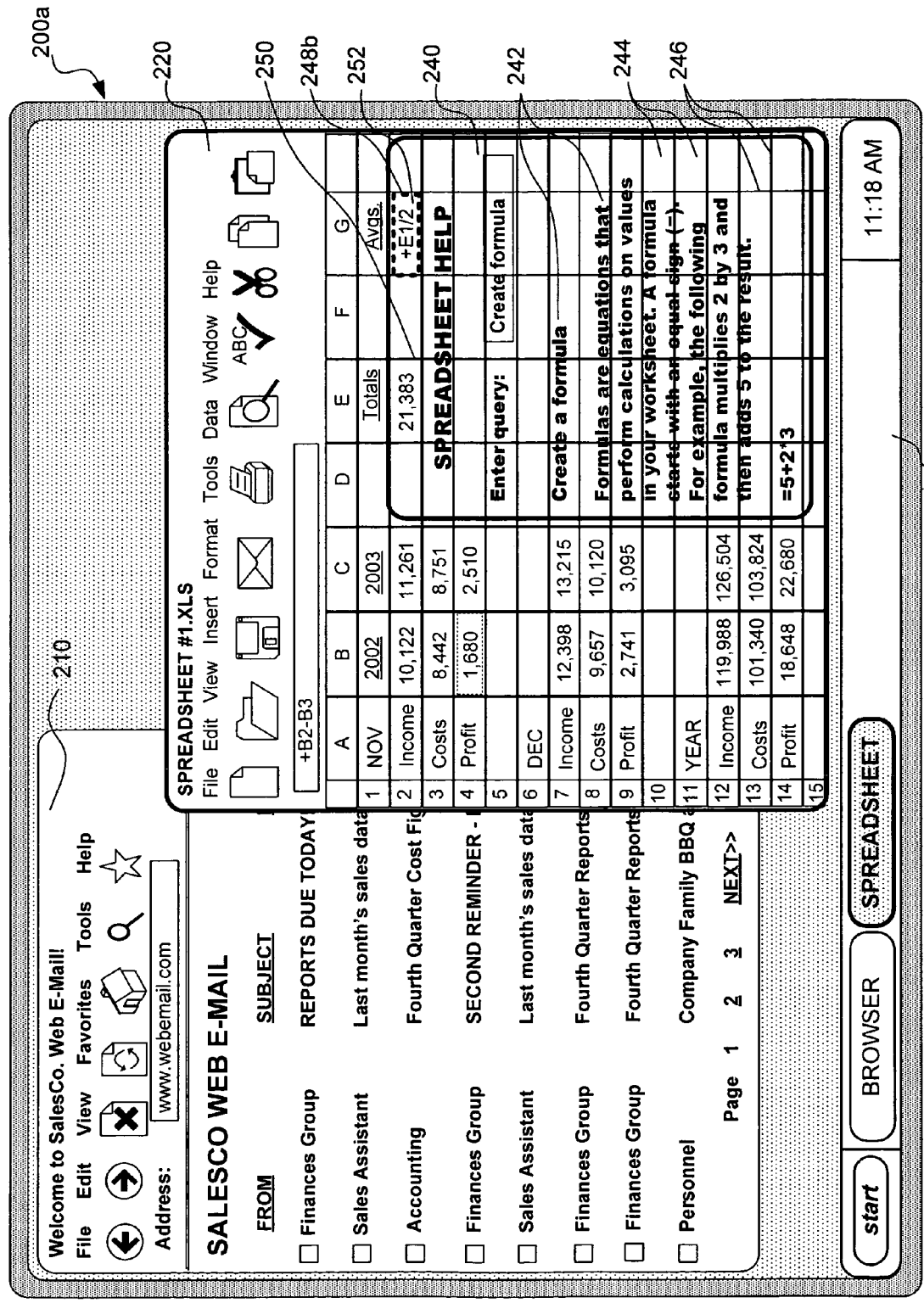

Furthermore, by accessing on-line help presented using unobtrusive overlay window 240, the user not only can see the content presented in the underlying spreadsheet window on display 200a (FIG. 2A), but can also edit, move an element, select items with a pointing device, and/or revise the content in the spreadsheet window underlying unobtrusive help window 240, all while unobtrusive help window 240 is still displayed and visible. As shown in FIG. 2B, with unobtrusive overlay window 240 still displayed and overlying the spreadsheet window, the user has selected and entered data in a cell 250, moved the cursor to and selected a cell 248b, and entered a formula in a cell 252. Therefore, even if the user needs to rely on line-by-line help content presented in unobtrusive overlay window 240 while working in a portion of the spreadsheet application that underlies the help text, the user can directly access the provided help without having to move the help window to work with the underlying content and without changing the focus, which simply remains on the spreadsheet window. Thus, using unobtrusive overlay window 240, a user can rely heavily on on-line help that is visible while the user continues working in the application in which the help is needed.

Continuing to refer to FIG. 2B, it should be noted that a task button does not appear in the task bar to represent the help provided in unobtrusive overlay window 240 as was the case for the conventional help window in the prior art example of FIG. 1B. As will be further described below in connection with FIG. 4, while it may be desirable to represent unobtrusive overlay window 240 with a task button in taskbar 230, in at least one embodiment of the present invention, a task button for unobtrusive overlay window 240 is not required and is omitted. Omission of a task button for the unobtrusive overlay window from taskbar 230 emphasizes that unobtrusive overlay window 240 is not an active window and is clearly not a conventional window. Because unobtrusive overlay window 240 is not an active window, unobtrusive overlay window 240 does not receive or intercept keystrokes, as would normally be the case for the foreground window in a stack of two or more conventional windows. Accordingly, the user can benefit from the help offered by unobtrusive overlay window 240 while interacting with the otherwise topmost window as though unobtrusive overlay window 240 were not present.

Facilitating Unobtrusive Pop-Up Windows

Figure 3A:
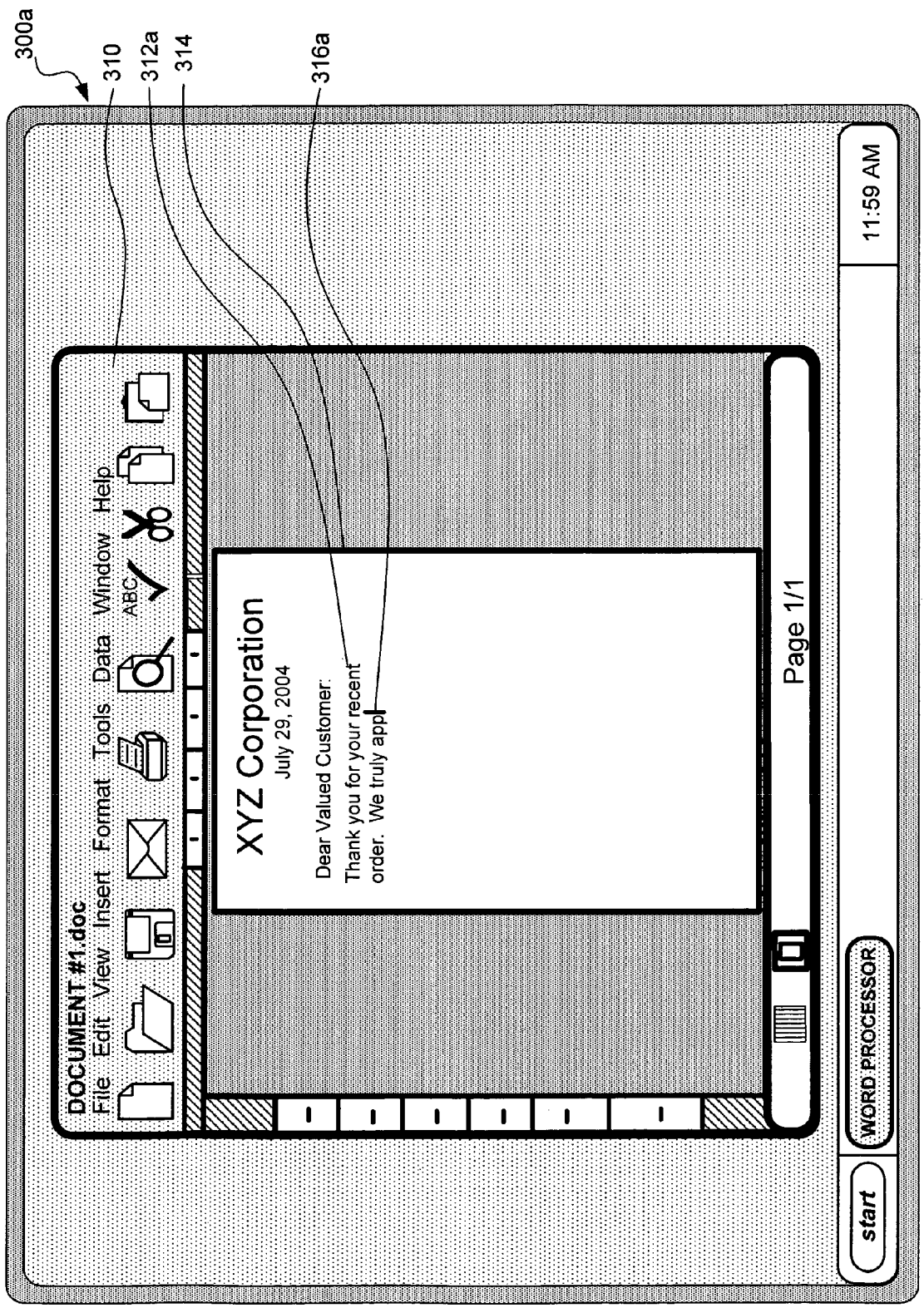
FIGS. 3A-3C are screens showing an unobtrusive window allowing a user to continue to enter input despite the emergence of an unobtrusive window presenting a calendar reminder on the display.

Unobtrusive overlay windows are useful not only for accessing on-line help as shown in FIGS. 2A-2B, but also for a myriad other purposes. For example, FIG. 3A shows a display 300a where a user engages only a single application program in a single display window 310. More specifically, application window 310 presents a word processing application. Using the word processing application presented in window 310, a user enters text 312a into a document 314 at a position marked by a cursor 316a.

Figure 3B:
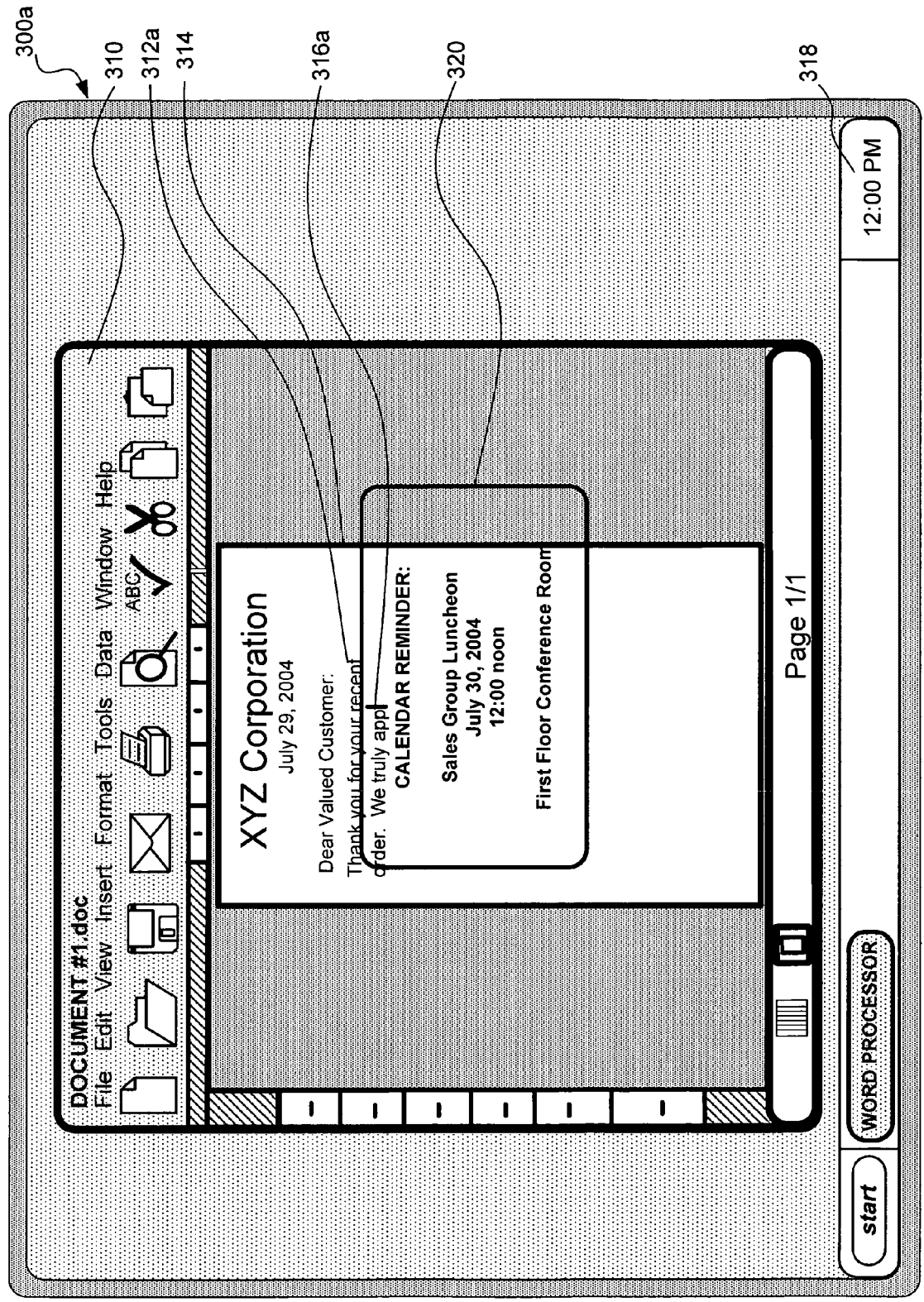

Referring to FIG. 3B, it is at that instant (based upon the time indicated by a clock 318), a pop-up window 320 appears over document 314 on display 300b. Pop-up window 320 includes a reminder generated by a calendar application, reminding the user of a scheduled appointment.

As is known to persons familiar with reminders and other similar pop-up windows, when conventional pop-up windows are displayed, they appear in the foreground. As a result, these pop-up windows are, at a minimum, visually obtrusive. Moreover, removing or concealing the window presents an interruption to the user, which may interrupt the user's train of thought. Furthermore, some pop-up windows automatically become the active window (i.e., the pop-up window "has the focus"). As a result, the pop-up window not only visually obscures any windows that it overlies, but also functionally blocks interaction with such windows. The active window receives, or intercepts, any user input. Thus, if the user were typing a document, and was in the middle of a thought and typing a sentence expressing that thought, the display of the pop-up window would cause the pop-up window to become the active window instead of the word processing application window. Thus, whatever the user was typing from the instant that the pop-up window appeared is intercepted by the pop-up windows and not entered into the word processing document. This problem is particularly troublesome to skilled typists who do not look at the screen when typing text, because such a user will likely not notice the appearance of the pop-up window, and as a result, a number of words or even several lines of text that were intended to be entered into the document will instead be lost.

In addition, if the user were about to make a selection in a window when a pop-up window appeared in the foreground over what previously was the foreground window, many nuisances may result. For example, if the pop-up window appeared directly over the position the user was about to select, the user's selection would apply to the pop-up window, possibly invoking an undesired action. Alternatively, if the pop-up window appeared in the foreground but not directly over the position the user was about to select, the user's selection would once again bring to the foreground what previously was the foreground window. Unfortunately, however, the user may have to repeat the input to make his or her selection, because the original action may result only in the window being restored to the foreground. Furthermore, if the user then wishes to close or otherwise engage the pop-up window, the user will have to locate the pop-up window by minimizing other windows or using the taskbar, then take the appropriate action. In sum, spontaneous appearance of conventional pop-up windows may change the foreground hierarchy of windows currently displayed, and necessitate the user performing a number of immediate steps to respond to the pop-up window and restore the display to the state that preceded the appearance of the pop-up window.

Figure 3C:
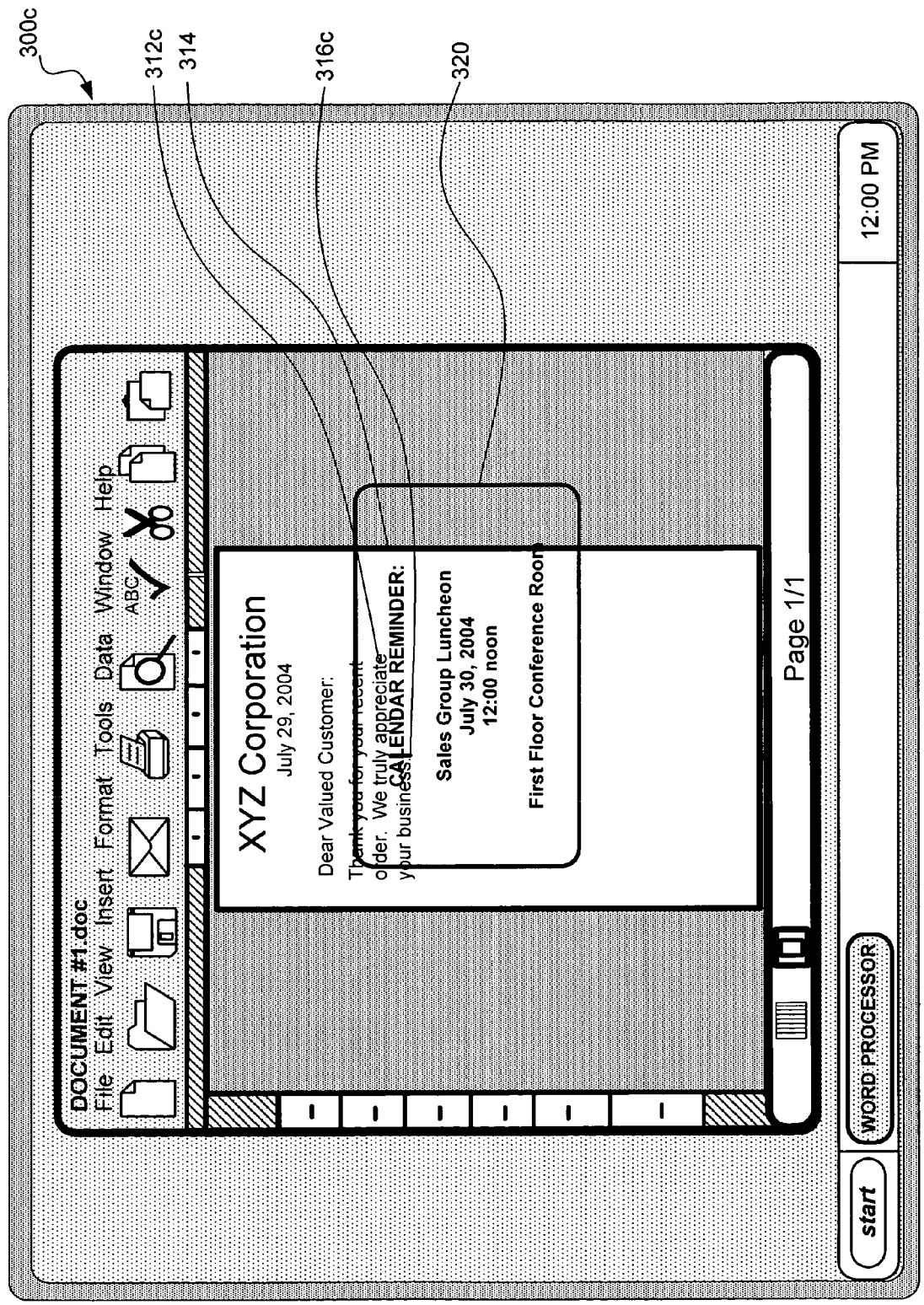

By contrast, an unobtrusive pop-up window 320 neither visually obscures the current active window nor functionally prevents the user's interaction with the current active window, which may underlie unobtrusive pop-up window 320. As shown in FIG. 3B, unobtrusive pop-up window 320 informs user of the reminder, while still enabling text 312a to be entered and viewed through the unobtrusive pop-up window. Furthermore, as shown in FIG. 3C, if the user is in the midst of entering text 312c into document 314, whether the user is looking at the display 300c or not, the text being typed will still be entered into the document in active window 310. As shown in FIG. 3C, cursor 316c has moved ahead as user continues adding text 312c.

Because of the unobtrusiveness of window 320, beyond calendar reminders, a schedule for the day might be presented on the display. Because the schedule would not visually or functionally interfere with the user in working with other content on the display, the schedule could be left displayed all day without inconvenience.

Unobtrusive Overlay Windows Set by User to Access Information

Use of unobtrusive overlay windows is not limited to help screens 240 (FIGS. 2A-2B) or pop-up windows 320 (FIGS. 3A-3C) or other content that generally appears in a superimposed, overlying form and position. Users can selectively make a window an unobtrusive overlay window to make use of display space to be able to view and/or use contents of a window without having that window block access to other windows that appear under the window that is made to be an unobtrusive overlay window.

Figure 4:
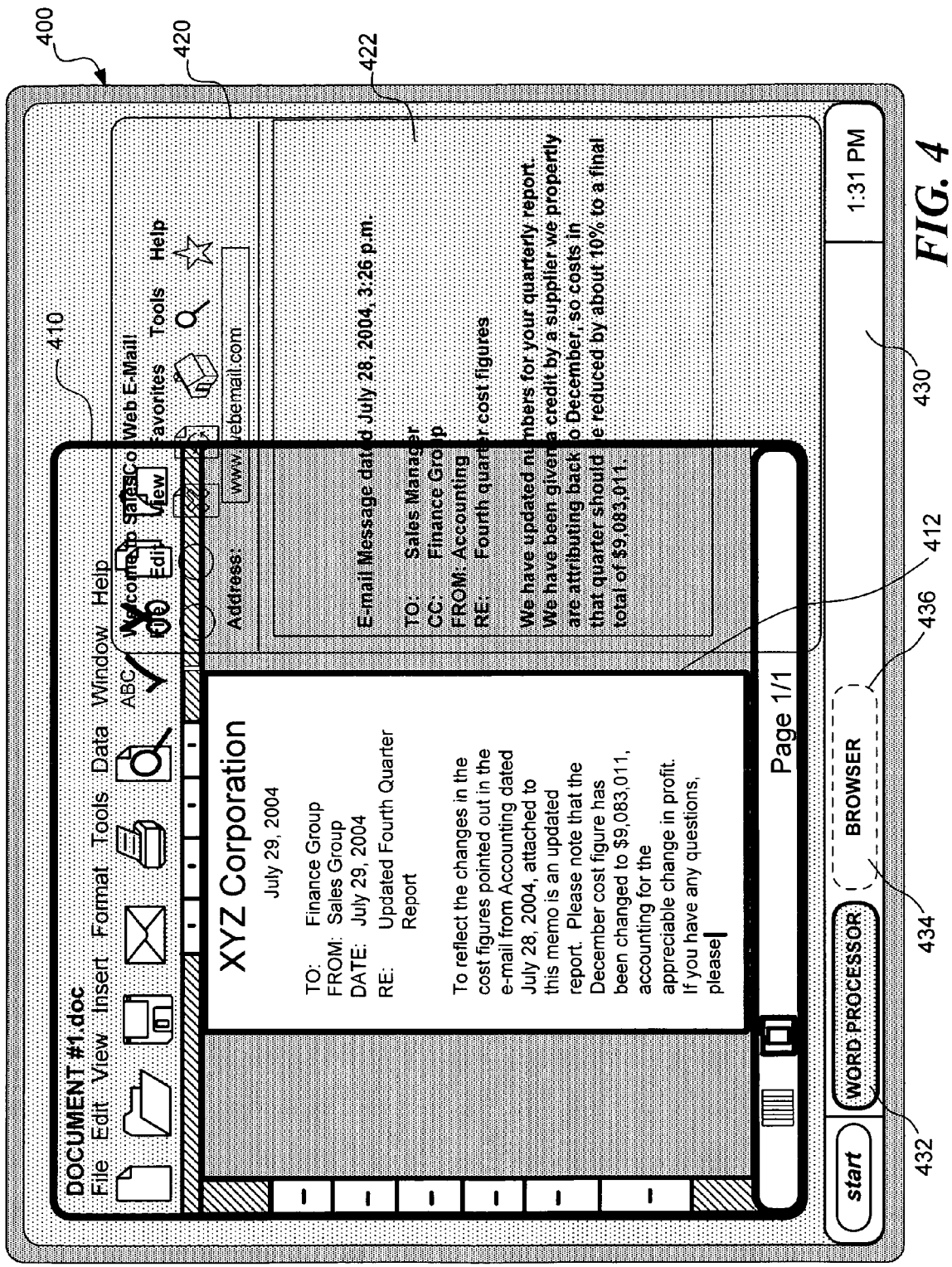
FIG. 4 is a screen showing a window made unobtrusive by a user, allowing the user to view the content of the unobtrusive window while entering input in another window overlapped by the unobtrusive window.

FIG. 4 shows a display 400 including two windows, an active window 410 and an unobtrusive overlay window 420. Active window 410 presents a word processing application in which user is creating a document 412. In order to access information that the user wants to include in document 412, the user needs to refer to the contents of an e-mail 422. As previously shown in FIGS. 1A-1B, even without the appearance of a pop-up window as shown in FIG. 1C, opening and accessing multiple windows might crowd the display, and the user might have to resort to switching between overlapping windows to be able to meaningfully access multiple windows of a workable size and scale.

However, instead of having to shift the focus between such overlapping windows through changing the active window, by making window 420 an unobtrusive overlay window, the user can view the content displayed in unobtrusive overlay window 420 to refer to the text of e-mail 422 without having to jump back and forth between windows 410 and 420, or attempting to resize or rescale one or both of the windows.

In a taskbar 430, a taskbar button 434 is rendered with a dotted outline 436 adjacent a highlighted taskbar button 432 that represents active word processing window 410. The dotted outline used for taskbar button 434 indicates that it represents unobtrusive overlay window 420 rather than a conventional window. As described above in connection with FIGS. 2A-2B and 3B-3C, unobtrusive overlay windows, such as unobtrusive overlay window 420, are not required to be associated with a taskbar button. However, as an alternative embodiment of the invention, a taskbar button such as taskbar button 434 may be included to represent the unobtrusive overlay window. In fact, as will be further described below, taskbar button 434 may serve to enable the user to cause the window to be selectively switched back and forth between an unobtrusive overlay window and a conventional window. In any case, this example shows that any window may be presented as an unobtrusive overlay window, and that use of unobtrusive overlay windows is not limited to help screens and pop-up windows.

Figure 5A:
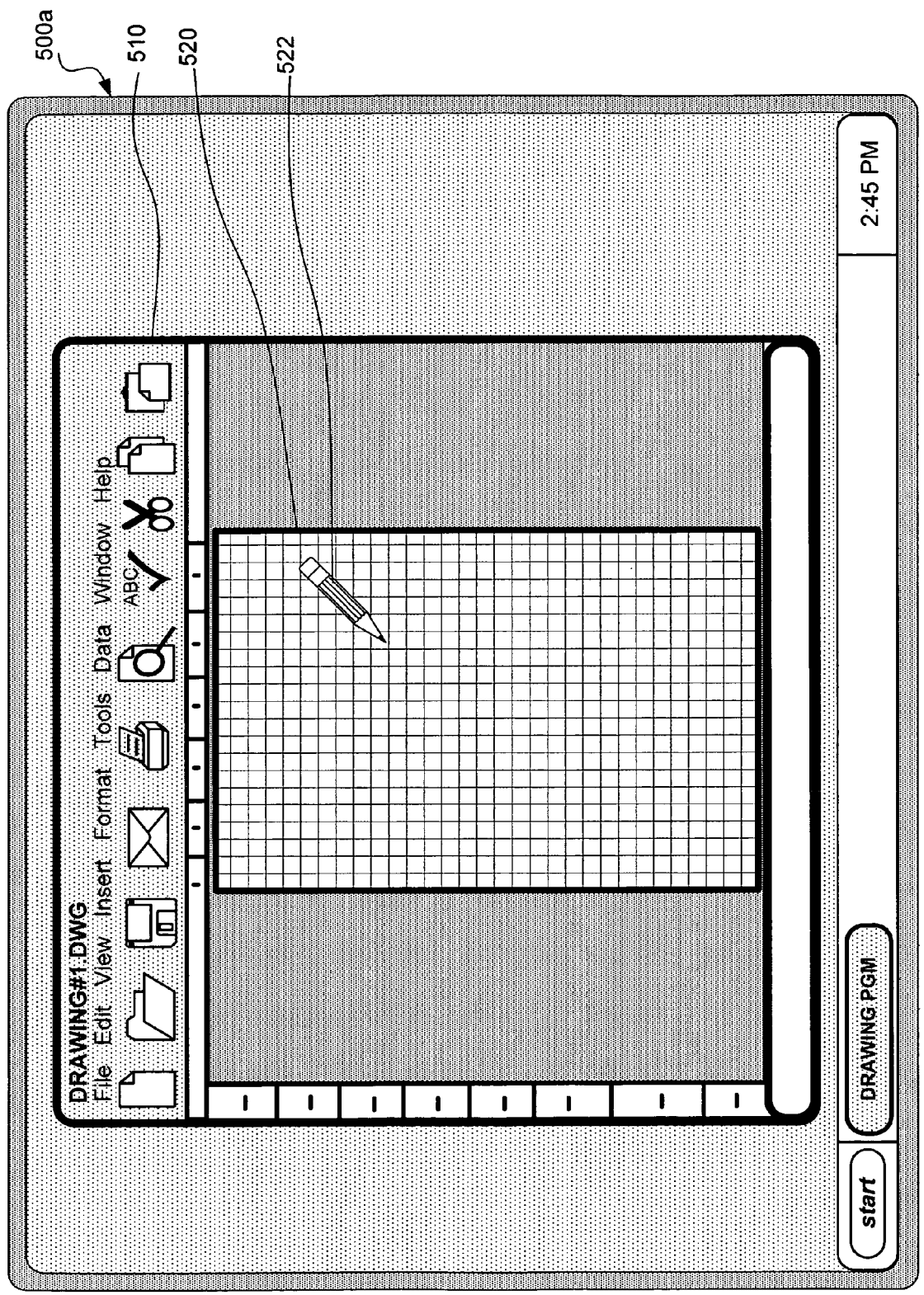

FIGS. 5A-5D show another use for unobtrusive overlay windows. In FIG. 5A, on a display screen 500a, a drawing application is running in an active window 510. In active window 510, a user creates a drawing 520 by manipulating a drawing cursor 522. Often, a user might desire to refer closely to, or even trace, a preexisting image. Unfortunately, however, using conventional windows, the active window would occlude any window that is behind it. Thus, if a user selected an image viewing application to view a preexisting image, it would cover the window in which the drawing program is executing, and the user would be unable to draw in the drawing window of the drawing program. On the other hand, when the window containing the drawing application is made active, it will cover the window in which the image-viewing program is executing.

Figure 5B:
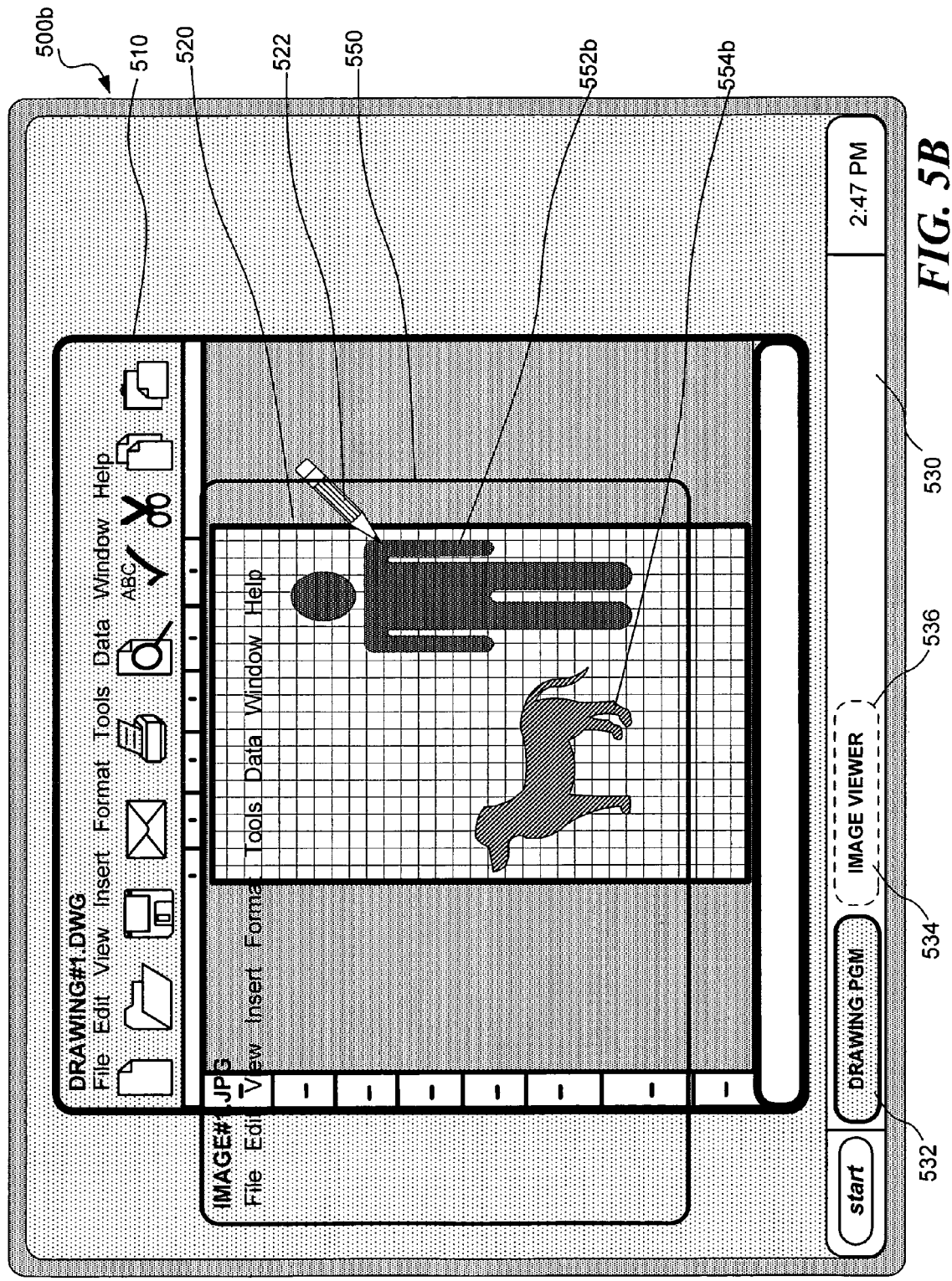

This problem is readily addressed using the present invention. As shown in FIG. 5B, an image can be presented in an unobtrusive overlay window that overlies the window in which the drawing program is executing. With the preexisting image presented in the unobtrusive overlay window, a user can readily trace the preexisting image within the drawing program. In a display screen 500b, an unobtrusive overlay window 550 presents an image of two objects 552b and 554b. Unobtrusive overlay window 550 is positioned over active window 510 and scaled (or vice versa) such that objects 552b and 554b can be traced within drawing 520 using a drawing cursor 522. The image viewing application may have been opened in a conventional window, but the user can then cause the application to be presented in unobtrusive overlay window 550.

Figure 5D:
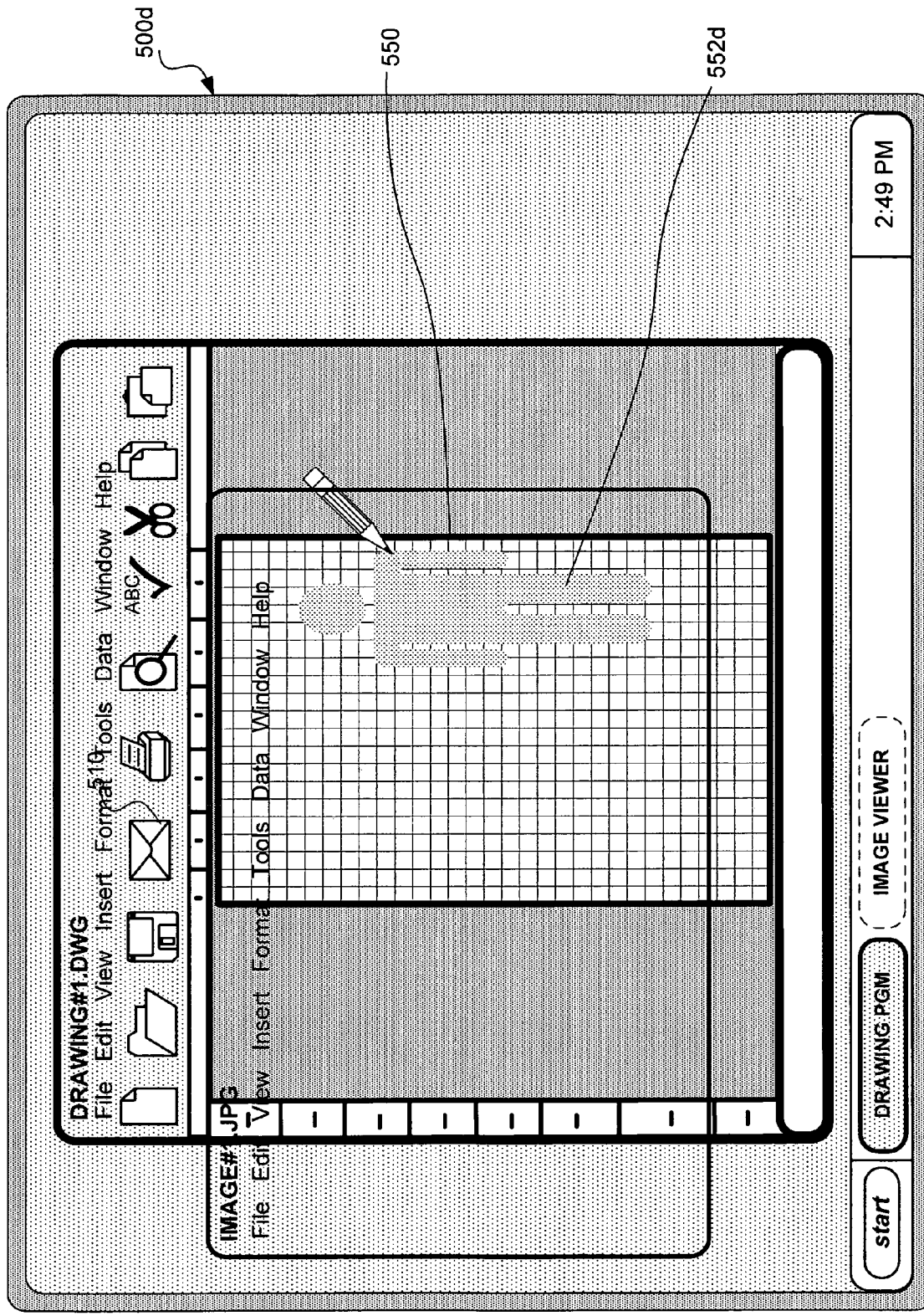

Other embodiments of the present invention enable various aspects of unobtrusive overlay window 550 to be further manipulated to suit various objectives. As shown in FIG. 5C, for example, a display screen 500c shows that objects 552c and 554c are presented less boldly and/or with increased transparency as compared to objects 552b and 554b (FIG. 5B). A user might desire that objects 552c and 554c be presented less vividly to cause what is being drawn in active window 510 to stand out from objects 552c and 554c. Also, as shown in FIG. 5D, a user might want to cause part of the image in unobtrusive overlay window 550, such as object 554c (FIG. 5C), not to be present on a display 500d. A user might, therefore, selectively cause objects having the color or colors of object 554 to become invisible, leaving only a desired object 552d as visible. Further, a title bar or menu bar of the unobtrusive overlay window may similarly be rendered less noticeable or made invisible. Various other such control options are facilitated by other embodiments of the present invention.

Logical Steps for Presenting Unobtrusive Overlay Windows

Figure 6:
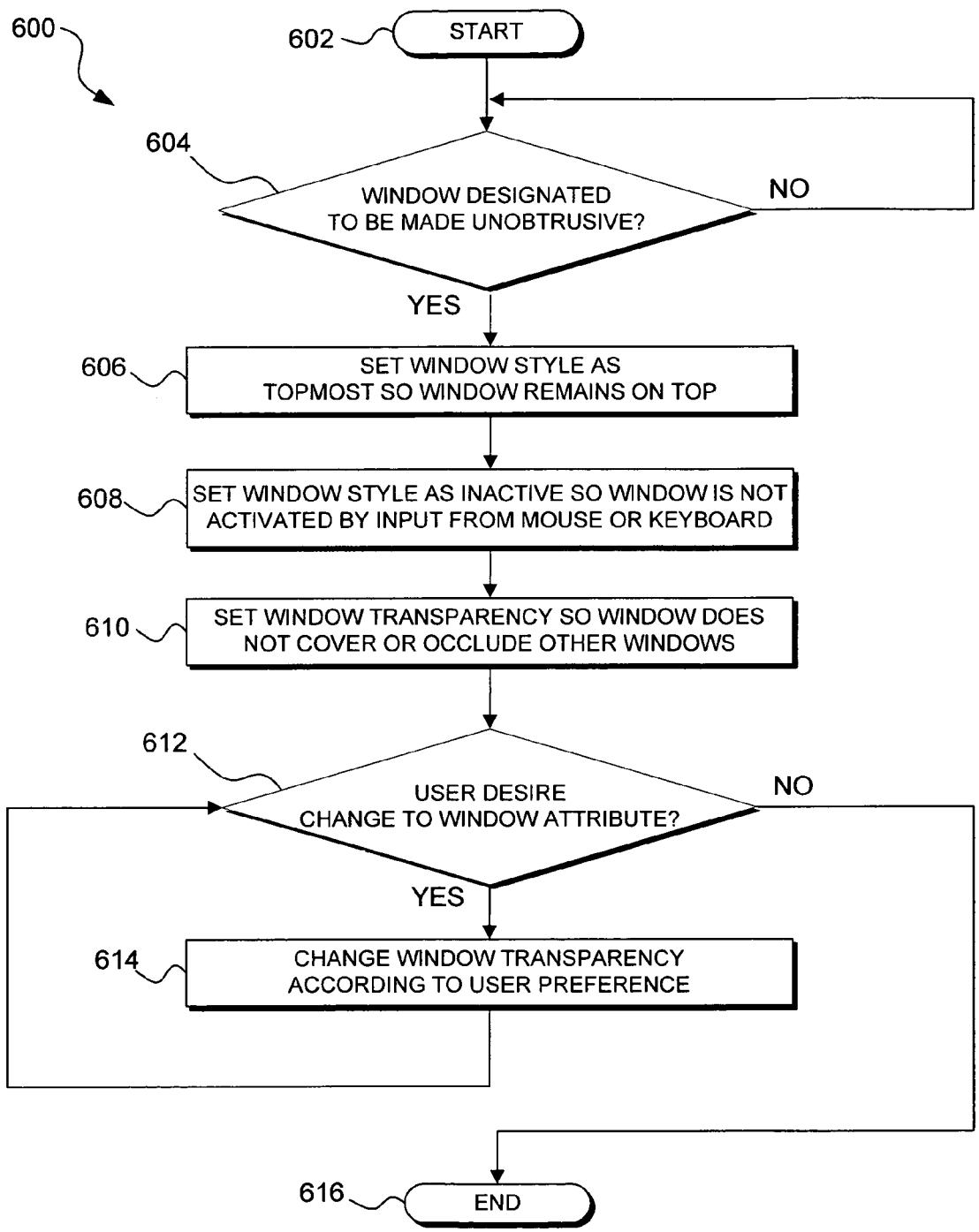
FIG. 6 is a flow diagram illustrating the logical steps for making a preexisting window unobtrusive.
Figure 7:
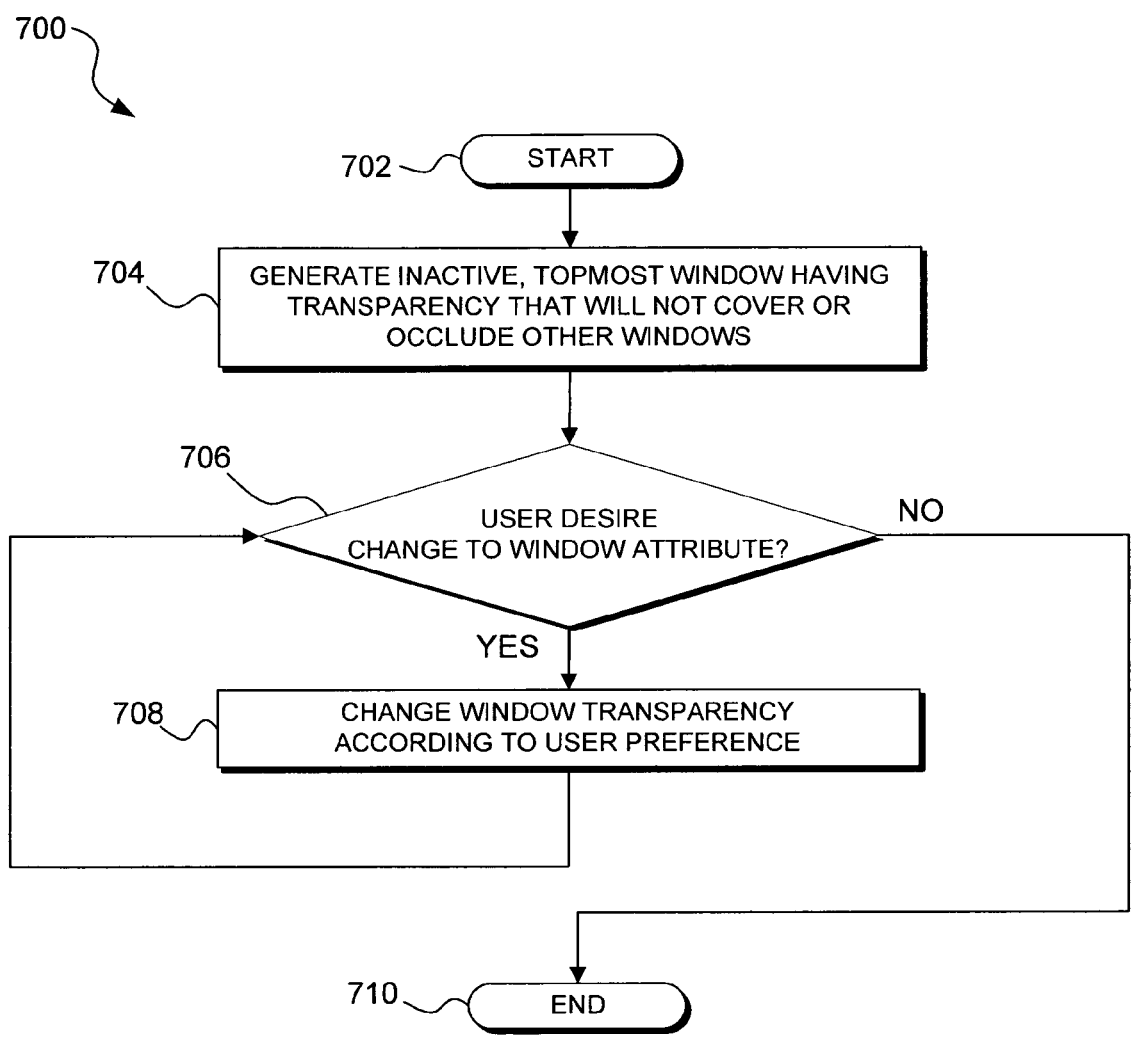
FIG. 7 is a flow diagram illustrating the logical steps for generating an unobtrusive window.

FIGS. 6 and 7 are flow diagrams 600 and 700, respectively, illustrating the logical steps for presenting unobtrusive overlay windows on a display. As previously described, existing windows may be made unobtrusive, as described in connection with FIG. 4, or new windows may be generated as unobtrusive windows, such a reminder windows or help screens described in connection with FIGS. 2A-3C. Flow diagram 600 illustrates one embodiment of a method for making a window unobtrusive, while flow diagram 700 illustrates an embodiment of a method for generating an unobtrusive window.

Flow diagram 600 begins at a step 602. At a decision step 604, it is determined if a pre-existing window has been designated by a user or program to be made unobtrusive. If it is determined that a window has not been designated to be made unobtrusive, flow diagram 600 loops to decision step 604 to continue monitoring for a window to be so designated. Thus, the obtrusive-rendering utility exemplified by flow diagram 600 remains available to a user until such point it is selected by a user. For example, a user might render a currently-selected window as unobtrusive from a menu invoked with a secondary pointing device or with a keystroke combination, such as CTRL-SHFT-SPACE.

Once it is determined at decision step 604 that a window is to be made unobtrusive, flow diagram 600 proceeds to step 606. At steps 606-610, in one embodiment of the present invention suitable for use with a Microsoft Corporation WINDOWS™ operating system, program calls are made to an operating system application program interface (API) to cause the window to be presented unobtrusively. Other embodiments of the present invention would be suitably configured to direct modules in other operating systems, display manager programs, or application programs, to render a window unobtrusively. It will be appreciated that steps 606-610 may be executed in an order different than depicted in flow diagram 600. Further, numerous variations on the embodiment described in flow diagram 600 may be employed. To name one example, unobtrusive windows may or may not be represented with taskbar buttons in the taskbar, and any number of visual attributes may be assigned to the unobtrusive windows.

At step 606, the window style is set as topmost so that the window designated as unobtrusive remains on top of other windows. Conventionally, as successive windows are opened at a common region on a display, the windows are stacked in successive layers, with the last window opened normally appearing on the top. When a window is selected to have the focus, that window is normally shifted to the top of the stack. Nonetheless, the embodiment of the present invention described in flow diagram 600 always maintains an unobtrusive overlay window on top of the stack. Thus, even if another window is "clicked into" to have the focus, as the user might click into the drawing application of FIGS. 5A-5D to enable drawing strokes to be input, the unobtrusive overlay window will not be covered by the other window and will remain visible. More specifically, a call such as shown in line (1), below, to the SetWindowPos API will cause the window that is the unobtrusive overlay window to remain displayed topmost:

BOOL result = ::SetWindowPos(targetWindow__,     (1)
HWND_TOPMOST, 0, 0, 0, 0, SWP_NOMOVE | SWP_NOSIZE);

The "HWND_TOPMOST" instruction causes the window to remain on top. Alternatively, if desired, step 606 may be omitted if it is not desired that the window always be made topmost.

At step 608, the window style for the unobtrusive overlay window is set as inactive, so that the unobtrusive overlay window cannot be made active by user input. At step 610, the window transparency is set so that the unobtrusive overlay window does not cover or occlude other windows. Both directives can be made in a single API call which, in the example of line (2), below, is a call to the SetWindowLong API:

LONG result = ::SetWindowLong(targetWindow__,     (2)
GWL_EXSTYLE, WS_EX_LAYERED |
WS_EX_TRANSPARENT |
WS_EX_NOACTIVATE );

In line (2) above, the "WS_EX_LAYERED" command enables the window to be made transparent or partially transparent, while the "WS_EX_TRANSPARENT" command, in conjunction with the WS_EX_LAYERED command, enables the unobtrusive overlay window to be clicked through, so that keyboard and mouse input are applicable to an underlying window and are not hindered by the presence of the unobtrusive overlay window. The "WS_EX_NOACTIVATE" command prevents the unobtrusive overlay window from being made active, for example, there is no taskbar button displayed in the taskbar for this window.

At step 610, the window transparency is set. The transparency level, or alpha value, is set to a desired level. Similarly, a selected color, or key color, can be made transparent so that it does not appear on the screen. Either or both directives can be made in a single API call which, in the example of line (3), below, is a call to the SetLayeredWindowAttributes API:

BOOL result = ::SetLayeredWindowAttributes     (3)
(targetWindow__, colorKey__, opacity__,
LWA_COLORKEY | LWA_ALPHA);

It should be noted that, instead of instantaneously changing the transparency of a window, it may be desirable to have the window fade from its initial appearance to a desired transparency level. As will be appreciated by those ordinarily skilled in the art, such a fade could be accomplished by a series of attribute changes, each of which changes the transparency of the window incrementally from its initial state to its desired state. In addition, it should be appreciated that it may be desired for the window to be functionally transparent, such that the window will not receive input, but remain opaque to mask content beneath it. For example, a gaming application may invite a user to pick an unseen option. An unobtrusive, opaque window thus could be used to visually mask choices in another window.

At a decision step 612, it is determined if the user wants to change any of the attributes of the unobtrusive overlay window. If not, flow diagram 600 ends at a step 616. On the other hand, if it is determined at step 612 that the user desires to change attributes, at a step 614, a user may change the window transparency to make the unobtrusive overlay window more or less transparent. For example, by pressing CTRL-SHFT-<, the window may be made more transparent, and by pressing CTRL-SHFT->, the window may be made less transparent. (Clearly, any other appropriate keystroke or combination of keystrokes may be designated for making these control inputs, or a setup window might be invoked to control these attributes.) Alternatively, a user may selectively activate another keystroke combination to change a color key preference, such as in the drawing application example of FIGS. 5A-5D, a keystroke combination to make a particular color or object transparent to suit a user's prerogatives. Also, under user control or program control, presentation of attributes such as a title bar, a system menu, a resizable border, a maximize button, and a minimize button may be suppressed.

Once the user has changed transparency and color key attributes as desired (if at all), flow diagram 600 loops to decision step 612 to determine if the user wants to make further changes. When the changes are satisfactory to the user, flow diagram 600 ends at step 616. It will be appreciated that, programmatically, control of these attributes need not be manifested as a decision step/loop. User controls may be a separate routine that may be invoked at any time from a menu, with a keystroke combination, or in another manner.

Flow diagram 700 illustrates an embodiment of the invention used by an application that generates windows predetermined to be unobtrusive, such as calendar reminders and help screens. Flow diagram 700 begins at step 702. At step 704, an unobtrusive window is generated. It is possible for the attributes to be set in a single API call so that the window is topmost, cannot be activated, and visually and functionally transparent in the example of line (4):

```
HWND hWnd =                                              (4)
    ::CreateWindowEx(WS_EX_LAYERED |
    WS_EX_TRANSPARENT | WS_EX_NOACTIVATE |
    WS_EX_TOPMOST, "ReminderWindow", "Reminder",
    WS_VISIBLE | WS_POPUP, 0, 0, 100, 100, NULL, NULL,
    NULL, 0);
```

The example of line (4) also sets additional attributes in the same call of CreateWindowEx, such as the WS_POPUP attribute that causes no title bar and border to be displayed for the window.

At a decision step 706, it is determined if the user wants to change any of the attributes of the unobtrusive overlay window, as previously described in connection with step 612 (FIG. 6). If not, flow diagram 700 ends at a step 710. On the other hand, if it is determined at step 706 that the user desires to change attributes, at a step 708, a user may change the window transparency to make the unobtrusive overlay window more or less transparent. Once the user has changed key attributes as desired (if at all), flow diagram 700 loops to decision step 706 to determine if the user wants to make further changes. When the changes are satisfactory to the user, flow diagram 700 ends at step 710.

Exemplary Computing System for Implementing the Present Invention

Figure 8:
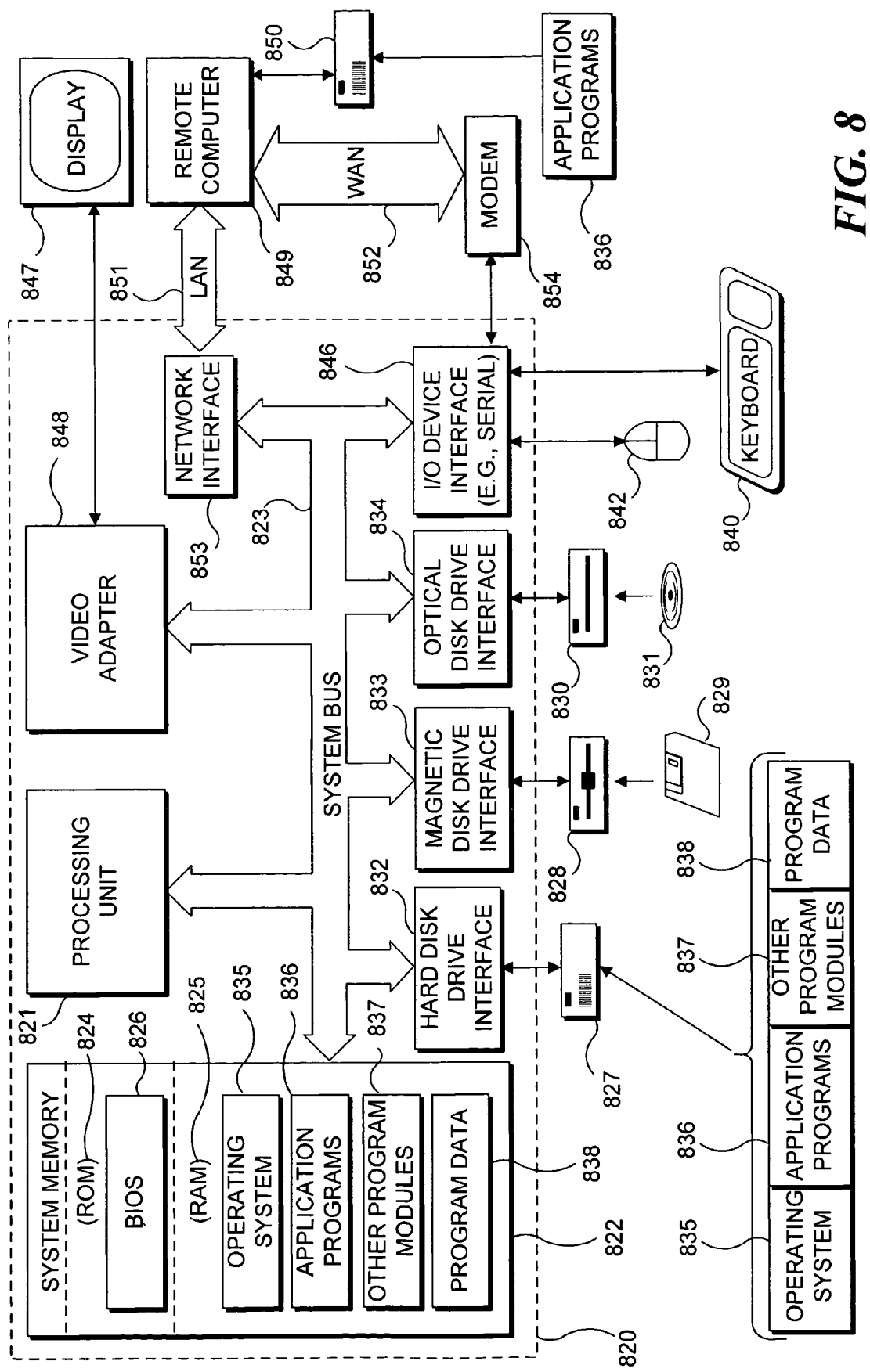
FIG. 8 is a functional block diagram of a generally conventional computing device or personal computer (PC) that is suitable for retrieving and/or presenting search results, in practicing the present invention.

With reference to FIG. 8, an exemplary system suitable for implementing various portions of the present invention is shown. The system includes a general purpose computing device in the form of a conventional PC 820, provided with a processing unit 821, a system memory 822, and a system bus 823. The system bus couples various system components including the system memory to processing unit 821 and may be any of several types of bus structures, including a memory bus or memory controller, a peripheral bus, and a local bus using any of a variety of bus architectures. The system memory includes read only memory (ROM) 824 and random access memory (RAM) 825. A basic input/output system 826 (BIOS), containing the basic routines that help to transfer information between elements within the PC 820, such as during start up, is stored in ROM 824. PC 820 further includes a hard disk drive 827 for reading from and writing to a hard disk (not shown), a magnetic disk drive 828 for reading from or writing to a removable magnetic disk 829, and an optical disk drive 830 for reading from or writing to a removable optical disk 831, such as a compact disk-read only memory (CD-ROM) or other optical media. Hard disk drive 827, magnetic disk drive 828, and optical disk drive 830 are connected to system bus 823 by a hard disk drive interface 832, a magnetic disk drive interface 833, and an optical disk drive interface 834, respectively. The drives and their associated computer readable media provide nonvolatile storage of computer readable machine instructions, data structures, program modules, and other data for PC 820. Although the exemplary environment described herein employs a hard disk, removable magnetic disk 829, and removable optical disk 831, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 829, optical disk 831, ROM 824, or RAM 825, including an operating system 835, one or more application programs 836, other program modules 837, and program data 838. A user may enter commands and information in PC 820 and provide control input through input devices, such as a keyboard 840 and a pointing device 842. Pointing device 842 may include a mouse, stylus, wireless remote control, or other pointer. Other input devices (not shown) may include a microphone, joystick, haptic joystick, yoke, foot pedals, game pad, satellite dish, scanner, camera, or the like. These and other input/output (I/O) devices are often connected to processing unit 21 through an I/O interface 846 that is coupled to the system bus 823. The term I/O interface is intended to encompass each interface specifically used for a serial port, a parallel port, a game port, a keyboard port, and/or a universal serial bus (USB). A display 847 can be connected to system bus 823 via an appropriate interface, such as a video graphics adapter 848. It will be appreciated that PCs are often coupled to other peripheral output devices (not shown), such as speakers (through a sound card or other audio interface—not shown) and printers.

The present invention may be practiced on a single machine, although PC 820 can also operate in a networked environment using logical connections to one or more remote computers, such as a remote computer 849. Remote computer 849 may be another PC, a server (which is typically generally configured much like PC 820), a router, a network PC, a peer device, or a satellite or other common network node, and typically includes many or all of the elements described above in connection with PC 820, although only an external memory storage device 850 has been illustrated in FIG. 8. The logical connections depicted in FIG. 8 include a local area network (LAN) 851 and a wide area network (WAN) 852. Such networking environments are common in offices, enterprise wide computer networks, intranets, and the Internet.

When used in a LAN networking environment, PC 820 is connected to LAN 851 through a network interface or adapter 853. When used in a WAN networking environment, PC 820 typically includes a modem 854, or other means such as a cable modem, Digital Subscriber Line (DSL) interface, or an Integrated Service Digital Network (ISDN) interface for establishing communications over WAN 852, such as the Internet. Modem 854, which may be internal or external, is connected to the system bus 823 or coupled to the bus via I/O device interface 846, i.e., through a serial port. In a networked environment, program modules, or portions thereof, used by PC 820 may be stored in the remote memory storage device. It will be appreciated that the network connections shown are exemplary and other means of establishing a communications link between the computers may be used, such as wireless communication and wide band network links.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for unobtrusively presenting selected visual content on a display that is coupled to a computing system to present an output thereof, and on which other visual content is presented, comprising the steps of:
   (a) designating the selected visual content from among a plurality of different types of visual content presentable by the computing system on the display and setting a window style of the selected visual content to 'INACTIVE' thus causing the selected visual content to not be activated by input from a mouse or a keyboard;
   (b) presenting the selected visual content in a region of the display such that the selected visual content is initially rendered visually and functionally unobtrusive so as to enable a user to direct input to the other visual content, even when the selected visual content at least partially occupies and overlies the region of the display occupied by the other visual content, and without requiring the user to affirmatively change how the selected visual content is initially rendered, the presenting including fading the selected visual content from an initial appearance to a desired transparency level; and
   (c) enabling the computing system to respond to the input directed to a portion of the other visual content to which the input is directed, even though the portion is overlaid by the selected visual content, as though the selected visual content were not being presented on the display.

2. The method of claim 1, wherein the selected visual content is presented in an overlay window on the display that is generated by an operating system executed by and controlling the computing system, and wherein the step of presenting the selected visual content on the display comprises the step of directing the operating system to apply attributes when presenting the overlay window to cause the operating system to render the selected visual content so as to enable a user to direct input to the other visual content presented within the region and enable the computing system to respond to the input directed to the other visual content as though the selected visual content were not being presented on the display.

3. The method of claim 2, further comprising the step of protecting the selected visual content from being masked by the other visual content in the region of the display wherein the selected visual content is protected from being masked by the other visual content by directing the operating system to apply an attribute that maintains the overlay window as a topmost window so that the other visual content is not presented over the selected visual content when the user directs input to the other visual content.

4. The method of claim 2, further comprising the step of rendering the selected visual content so that the selected visual content is at least partially visibly transparent, thereby enabling the user to view the other visual content through the selected visual content.

5. The method of claim 2, wherein the selected visual content is rendered as partially visually transparent by changing at least one of an alpha value and a color key value in the attributes used to present the overlay window on the display wherein the color key value is set such that a background color of the overlay window is not displayed.

6. The method of claim 5, wherein at least one of a plurality of attributes of the overlay window is not displayed.

7. The method of claim 6, wherein the attribute of the overlay window not displayed includes at least one of:
   (a) a title bar;
   (b) a system menu;
   (c) a resizable border;
   (d) a maximize button; and
   (e) a minimize button.

8. The method of claim 5, further comprising the step of enabling adjustment of one of the alpha value and the color key value to vary a transparency of the overlay window.

9. The method of claim 2, wherein the selected visual content is rendered as at least one of functionally and visually transparent by changing at least one of a layer attribute and a transparency attribute of the overlay window.

10. The method of claim 2, further comprising the step of causing the overlay window not to be listed in a list of windows currently available on the display.

11. The method of claim 10, wherein the list of windows currently available in the display includes a taskbar including taskbar buttons for windows currently available on the display other than the selected content.

12. A memory medium having machine executable instructions stored for carrying out the steps of claim 1.

13. A method for unobtrusively presenting selected visual content in a display under control of a computing system without affecting access to other visual content included in the display, comprising the steps of:
   (a) designating an overlay window as an unobtrusive overlay window for presenting the selected visual content in response to one of a user input and control by a software program that is executing on the computing system wherein the selected visual content presented in the display includes at least one of text, graphics, an open area, an image, and a video; and
   (b) directing an operating system executed by and controlling the computer system to present the unobtrusive overlay window in a region of the display, and setting a window style of the unobtrusive overlay window to 'INACTIVE' thus causing the unobtrusive overlay window to not be activated by input from a mouse or a keyboard, while enabling the user to continue to engage other visual content presented by the computer system in the region by setting attributes of the unobtrusive overlay window, said attributes causing a plurality of steps to be carried out, including:
      (i) protecting the selected visual content included in the unobtrusive overlay window from being masked by the other visual content by directing the operating system to maintain the unobtrusive overlay window as a topmost window so that the other visual content is not presented over the selected visual content in the display when the user directs input to the other visual content wherein the protecting is carried out by functions provided in the operating system being executed by the computing system; and
      (ii) rendering the selected visual content so as to enable the user to continue to direct input to the other visual content as though the selected visual content were not being presented on the display and enabling the computing system to respond to input directed to the other visual content as though the unobtrusive overlay window were not presented in the display, the rendering including fading the selected visual content from an initial appearance to a desired transparency level and wherein the rendering is carried out by functions provided in the operating system being executed by the computing system and wherein the unobtrusive overlay window is rendered as at least partially visually transparent by changing at least one of an alpha value and a color key value applied when rendering the unobtrusive overlay window;

(iii) passing user input and program control to the other visual content overlaid by the unobtrusive overlay window, thereby enabling the user to direct input to the other visual content as though the unobtrusive overlay window were not present on the display; and c) causing the unobtrusive overlay window not to be listed in a list of windows currently available on the display wherein the list of windows currently available in the display includes a taskbar including taskbar buttons for windows currently available on the display other than the selected content.

14. The method of claim 13, wherein the color key value of the unobtrusive overlay window is set such that a background color of the overlay window is not displayed.

15. The method of claim 13, wherein at least one of a plurality of attributes of the unobtrusive overlay window is not displayed.

16. The method of claim 15, wherein the attribute of the overlay window not displayed includes at least one of:
(a) a title bar;
(b) a system menu;
(c) a resizable border;
(d) a maximize button; and
(d) a minimize button.

17. The method of claim 13, further comprising the step of enabling adjustment of one of the alpha value and the color key value to selectively control an extent of the transparency of the unobtrusive overlay window.

18. The method of claim 13, wherein the unobtrusive overlay window is rendered as at least one of functionally and visually transparent by changing at least one of a layer attribute and a transparency attribute of the unobtrusive overlay window.

19. The method of claim 13, wherein the user input and program control include at least one of text, a control interaction, a movement of at least a component of the other visual content, and an interaction with the other visual content using a pointing device.

20. The method of claim 15, wherein the at least one of a plurality of attributes of the unobtrusive overlay window not displayed includes at least one of:
(a) a title bar;
(b) a system menu;
(c) a resizable border;
(d) a maximize button; and
(e) a minimize button.

21. The method of claim 13, further comprising the step of enabling a user to adjust the at least one of the alpha value and the color key value to selectively control the desired transparency level of the unobtrusive overlay window.

22. A system for unobtrusively presenting an overlay window on a display screen on which other visual content is presented, the system comprising:

(a) at least one user input device;
(b) a display;
(c) a processor in communication with the input device and the display; and
(d) a memory in communication with the processor, the memory storing data and machine instructions that cause the processor to carry out a plurality of functions, including:
(i) designating the selected visual content via one of a user input and a control asserted by a software program executed by the processor and setting a window style of the selected visual content to 'INACTIVE' thus causing the selected visual content to not be activated by input from a mouse or a keyboard;
(ii) presenting the selected visual content in a region of the display such that the selected visual content is initially rendered visually and functionally unobtrusive so as to enable a user to direct input to the other visual content even when the selected visual content at least partially occupies the region of the display occupied by the other visual content, and without requiring a user to affirmatively change how the selected visual content is initially rendered, the presenting including fading the selected visual content from an initial appearance to a desired transparency level, and wherein the selected visual content is protected from being masked by the other visual content by the machine instructions directing the processor to present the selected visual content in a topmost window so that the other visual content is not presented over the selected visual content when the user directs input to the other visual content, and wherein the selected visual content is rendered as at least partially visually transparent in response to the machine instructions directing the processor to set at least one of an alpha value and a color key value of the selected visual content to achieve the at least partially visually transparent rendering, and wherein the machine instructions further direct the processor to accept input from the at least one user input device to adjust the alpha value and the color key value to control the desired transparency level of the window in which the selected visual content is presented; and
(iii) enabling the computing system to respond to the input directed to a portion of the other visual content to which the input is directed, even though the portion is overlaid by the selected visual content, as though the selected visual content were not being presented on the display.

23. The system of claim 22, wherein the window in which the selected visual content is presented is rendered at least one of functionally transparent and partially visually transparent in response to the instructions in memory directing the processor to change at least one of a layer attribute and a transparency attribute of the window.

24. The system of claim 22, wherein the window in which the selected visual content is presented is not listed in a list of windows currently available on the display.

25. The system of claim 24, wherein the list of windows currently available in the display includes a taskbar including taskbar buttons for windows currently available on the display other than the selected content.

* * * * *